(12) United States Patent
Delagrange et al.

(10) Patent No.: US 8,798,269 B2
(45) Date of Patent: Aug. 5, 2014

(54) METHOD AND SYSTEM FOR SECURED BROADCASTING OF A DIGITAL DATA STREAM

(75) Inventors: Sylvain Delagrange, Paris (FR); Jakub Pieniazek, Savigny S/Orge (FR)

(73) Assignee: Bouygues Telecom, Paris (FR)

( * ) Notice: Subject to any disclaimer, the term of this patent is extended or adjusted under 35 U.S.C. 154(b) by 0 days.

(21) Appl. No.: 13/635,355

(22) PCT Filed: Mar. 16, 2011

(86) PCT No.: PCT/EP2011/053994
§ 371 (c)(1),
(2), (4) Date: Nov. 21, 2012

(87) PCT Pub. No.: WO2011/113870
PCT Pub. Date: Sep. 22, 2011

(65) Prior Publication Data
US 2013/0058484 A1    Mar. 7, 2013

(30) Foreign Application Priority Data

Mar. 17, 2010   (FR) ..................................... 10 01058

(51) Int. Cl.
*H04K 1/00* (2006.01)
(52) U.S. Cl.
USPC ......................................................... 380/255
(58) Field of Classification Search
USPC ......................................................... 380/255
See application file for complete search history.

(56) References Cited

U.S. PATENT DOCUMENTS 6,873,853 B2 * 3/2005 Kim ............................... 455/466
7,401,232 B2 * 7/2008 Ono et al. ...................... 713/193

(Continued)

FOREIGN PATENT DOCUMENTS

EP    1 365 589 A1    11/2003

OTHER PUBLICATIONS

A Secure Group Communication Using Non-Interactive Key Computation in Multiparty Key Agreement, S. Kalaiselvi, ICCCn 2008, IEEE.*

(Continued)

*Primary Examiner* — Luu Pham
*Assistant Examiner* — Gita Faramarzi
(74) *Attorney, Agent, or Firm* — Blakely Sokoloff Taylor & Zafman

(57) ABSTRACT

A method and system for secured broadcasting of a digital data flow between a technical platform (1) and at least one terminal (2), characterized in that it comprises the following steps:

Figure 1:
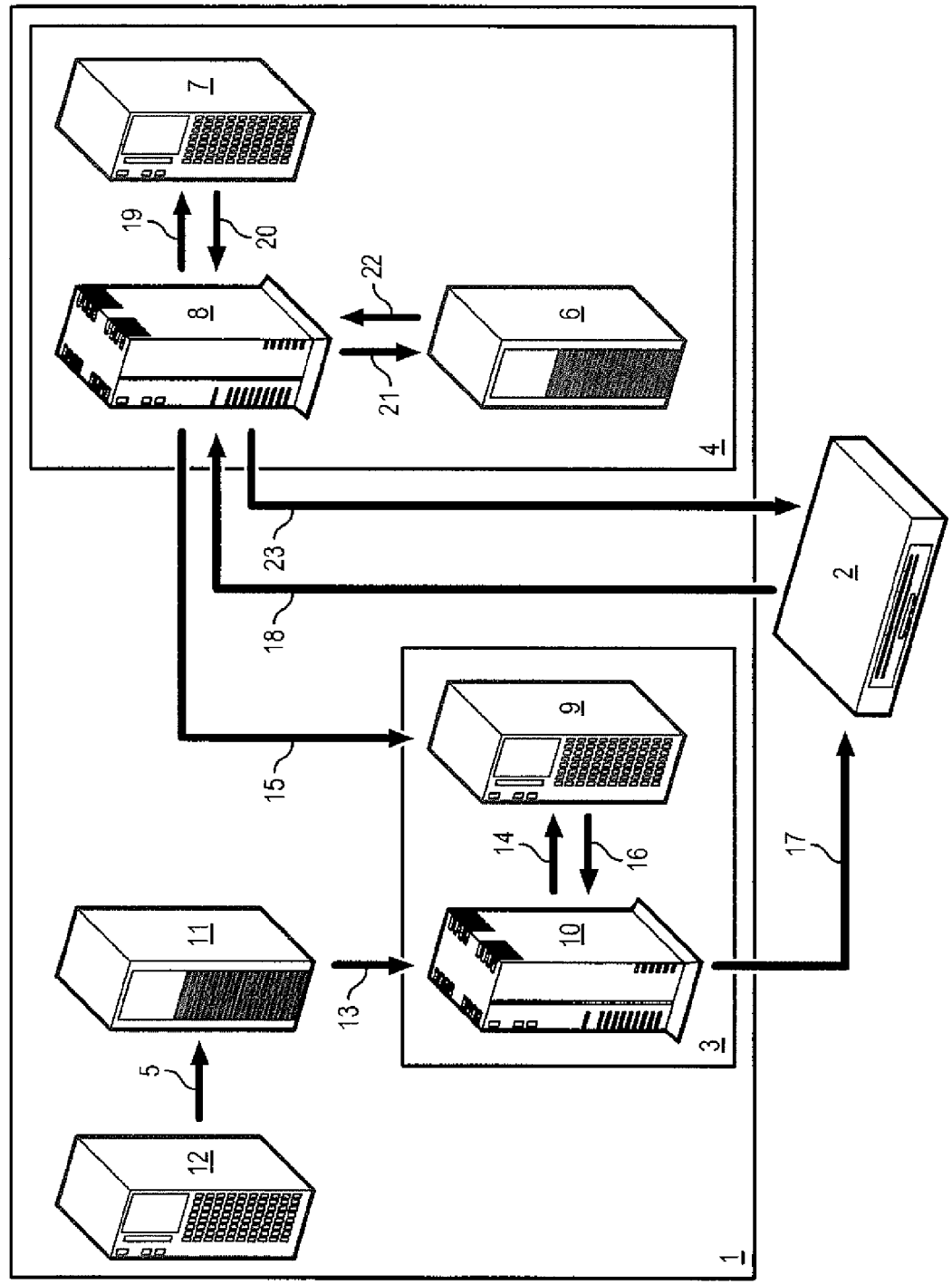

transmitting a scrambled and multiplexed digital data flow with at least one message (ECM) including a control key (CW) encrypted by a channel key (CC);

descrambling in a secured memory area of the terminal (2) the scrambled digital data flow from the control key (CW) obtained according to the following substeps;

sending to the technical platform (1) a request including the identifier ($IU_i$) of the terminal (2);

generating a secret key (CSk) from a cryptographic mechanism (A) using a single ciphering key ($BSK_n$) and the identifier ($IU_i$) of the terminal (2) with view to ciphering said channel key (CC) and obtaining a message (eCCk);

deciphering the message (eCCk) received by a terminal (2) from the key (CSk) initially stored in the terminal (2) so as to obtain the channel key (CC), and obtaining the control key (CW) resulting from the deciphering of the message (ECM) from the channel key (CC).

8 Claims, 4 Drawing Sheets

(56) References Cited

U.S. PATENT DOCUMENTS

| | | | |
|---|---|---|---|
| 7,724,907 B2* | 5/2010 | Candelore | 380/281 |
| 8,341,714 B2* | 12/2012 | Muller et al. | 726/9 |
| 2004/0086127 A1 | 5/2004 | Candelore | |
| 2005/0021985 A1 | 1/2005 | Ono et al. | |

OTHER PUBLICATIONS

Secure communication in IPTV broadcasting, Song-Hee Lee, vol. 62 Issue 1, Oct. 2012, ACM Digital Library.*

Vedder, K., "GSM: Security, Services, and the SIM," *Lecture Notes in Computer Science*, vol. 1528, Jan. 1, 1998, Springer, Germany, XP009138337, pp. 224-240.

* cited by examiner

METHOD AND SYSTEM FOR SECURED BROADCASTING OF A DIGITAL DATA STREAM

This is a non-provisional application claiming the benefit of International Application Number PCT/EP2011/053994 filed Mar. 16, 2011.

TECHNICAL FIELD OF THE INVENTION

The invention relates to a method and to a system for secured broadcasting of a digital data flow.

The invention is included in the field of telecommunications networks for distributing digital audiovisual data flows. It is notably aimed at guaranteeing to the providers of audiovisual and/or multimedia contents that the distribution of their contents over a telecommunications network will be secured.

STATE OF THE PRIOR ART

In the present context of increase in throughput of connections to the Internet, and the emergence of offers to distribute audiovisual data, novel devices are required for the user in order to benefit from these offers.

Indeed, a user intending to benefit today from a traditional offer of the satellite, cable type or further from an IP video offer, will have to have a decoder of the decoder box type (Set-Top Box).

This type of box provides the interface between an arrival of digital signals broadcast in real time by a technical platform via satellite means, by cable, ADSL, or by terrestrial digital broadcasting (DVB, "Digital Video Broadcasting") on the one hand and an analog television set on the other hand. Such a set-top box is a stand-alone device.

Generally, such a box within the scope of its operations receives one or more programs as a flow of compressed digital data, i.e. of which the video frames (i.e. the images) and the audio frames are coded so as to reduce the volume of broadcast data. For example, this coding observes the specifications of the MPEG-2 standard (ISO/IEC 13818-2) or MPEG 4 standard (ISO/IEC 144-96).

This standard defines a technique for compressing data for coding moving images and sound (notably for digital television). According to the vocabulary of the MPEG standard, the flow of compressed digital data is called a transport stream. This flow contains audio data in packets and video data in packets.

Within the scope of the broadcasting of this flow of compressed digital data, the technical platform applies standardized scrambling and encrypting mechanisms with which reception of the audiovisual or multimedia contents of this flow may be reserved to only authorized users, most often clients for example who have subscribed to a channel broadcast by the technical platform.

In such a context, the general problem which is posed is to avoid, in spite of the use of scrambling and encrypting mechanisms that the contents of the flow of digital data may be determined from an algorithmic or hardware element—cryptanalysis methods—or further by stealing ciphering/deciphering keys having been used for encrypting or scrambling this flow.

Patent document U.S. Pat. No. 4,531,020 is known from the prior art, which describes a method for secured broadcasting of a digital data flow from a technical platform to a decoding box in which the data flow is ciphered from service and group ciphering/deciphering keys, the specificity of which is of being function of access rights, of contents of the data flow, associated with the user of the decoder box. These keys are subsequently transmitted to the box so as to decipher the data flow according to the rights acquired by the user.

However, a major drawback of such a system is related to the fact that a malevolent user may steal these ciphering/deciphering keys by reading the memory bus of this decoder box and may, for example according to the known principle of "Control Word Sharing", share them with other users who may thereby illegally access the contents of these flows of digital data.

DISCUSSION OF THE INVENTION

The present invention aims at solving the problem related to the encountered technical difficulties in order to avoid theft of the ciphering/deciphering keys used within the scope of secured broadcasting of digital data flows.

The invention proposes to improve the security of broadcasting flows of digital data by systematically regenerating during ciphering procedures, a secret key used for ciphering the keys to be transmitted, and by achieving deciphering in a secured memory area of the terminal, i.e. the set-top box.

With this purpose, an aspect of the invention relates to a method for secured broadcasting of a digital data flow between a technical platform and at least one platform, said method comprising the following steps:
- transmitting a scrambled and multiplexed digital data flow with at least one ECM message including a control key CW encrypted with a channel key CC;
- descrambling in the secured memory area of the terminal, the scrambled digital data flow from the control key CW obtained according to the following substeps:
  - sending to the technical platform a request including the identifier $IU_i$ of the terminal;
  - generating a secret key CSk from a cryptographic mechanism A using a unique ciphering key $BSK_n$ and the identifier $IU_i$ of the terminal in order to cipher said channel key CC and to obtain an eCCk message;
  - deciphering the eCCk message received by the terminal from the CSk key initially stored in the terminal so as to obtain the channel key CC, and
  - obtaining the control key CW resulting from the deciphering of the ECM message from the channel key CC.

Thus, the invention provides the advantage of securely generating keys in a secured environment, and of protecting the secret keys inserted into the TV decoders, in order to avoid provisioning of these keys (logistics and costs) thereby avoiding risks related to these security problems in the storage and transfer and exposure of the keys during their use, by means of a solution for storing and securely using secret keys by an HSM at the key server, as well as inserting these keys into the secured area of the STB chipset by HSM.

According to particular embodiments:
- the transmission step includes the following substeps:
  - generating a channel key CC;
  - generating the control key CW;
  - scrambling the digital data flow from a control key CW;
  - ciphering the control key CW from the channel key CC so as to obtain an ECM message, and
- the generation step comprises a substep for identifying a ciphering key index n associated with the identifier of the terminal and stored within a server for managing the rights relating to the contents of the data flow, so as to determine the ciphering key $BSK_n$ from a plurality of ciphering keys archived in a server for generating secret keys CSk, corresponding to this index for a use aiming at generating the secret key CSk;

the cryptographic algorithm is selected from one of the following elements: MD5, RS, SHA-1 or further SHA-256;

the message CSk is sent to the terminal on the basis of a secured communication procedure of the SSL type, and the substep for generating the control key CW may be performed every 10 seconds.

The invention also relates to a system for secured broadcast of a digital data flow between a technical platform and at least one terminal, said technical platform comprises a unit for ciphering the data flow and a unit for generating ciphering/deciphering keys, as well as means for connecting with said at least one terminal including a chipset comprising a secured area storing a secret key CSk.

According to particular embodiments:

the unit for generating ciphering/deciphering keys comprises:
a server for managing the rights relating to the contents of the data flow, archiving ciphering key indices n associated with identifiers $IU_i$ of terminals;
a server for handling channel keys CC, and
a server for generating secret keys CSk, and the unit for ciphering the data flow includes:
a scrambling and multiplexing server, and
a ciphering server.

SHORT DESCRIPTION OF THE FIGURES

Figure 2:
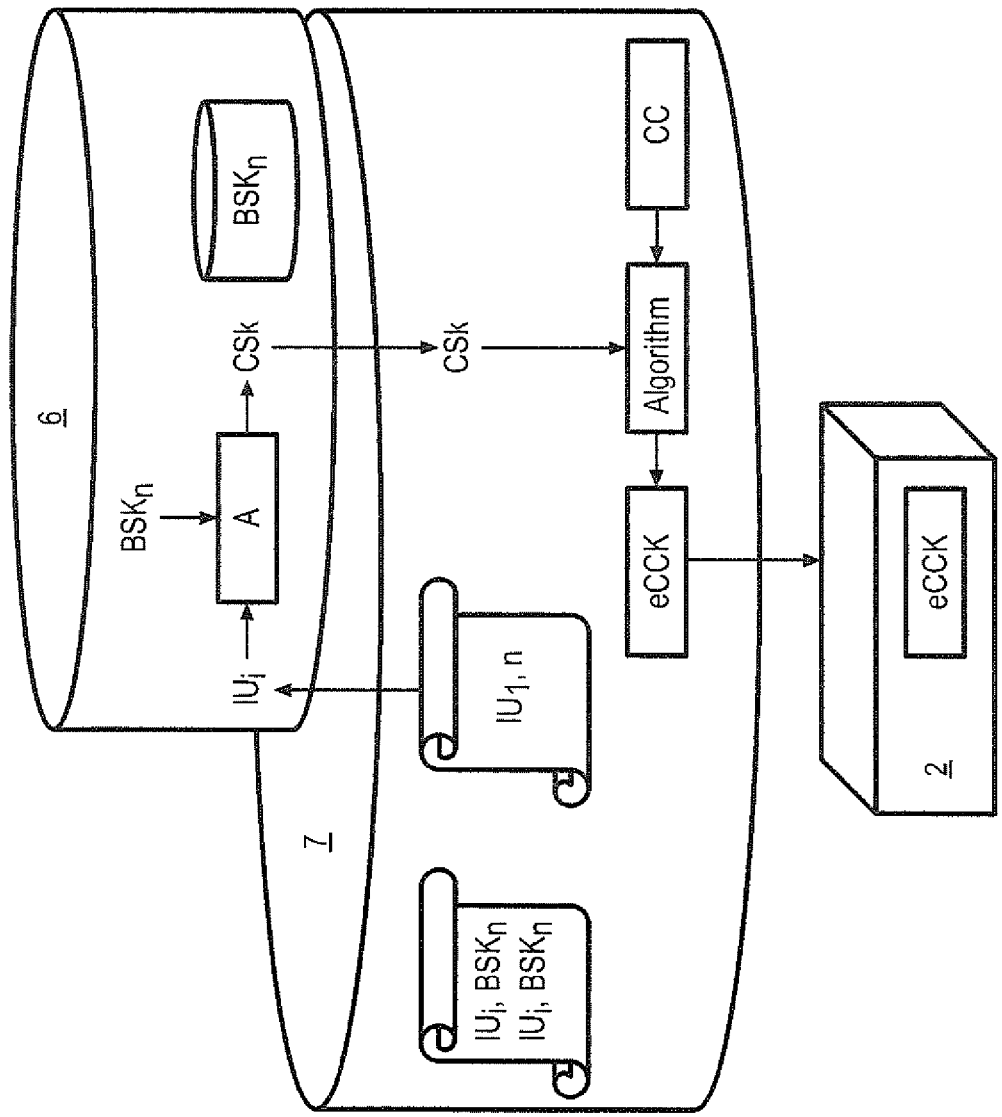
Figure 3:
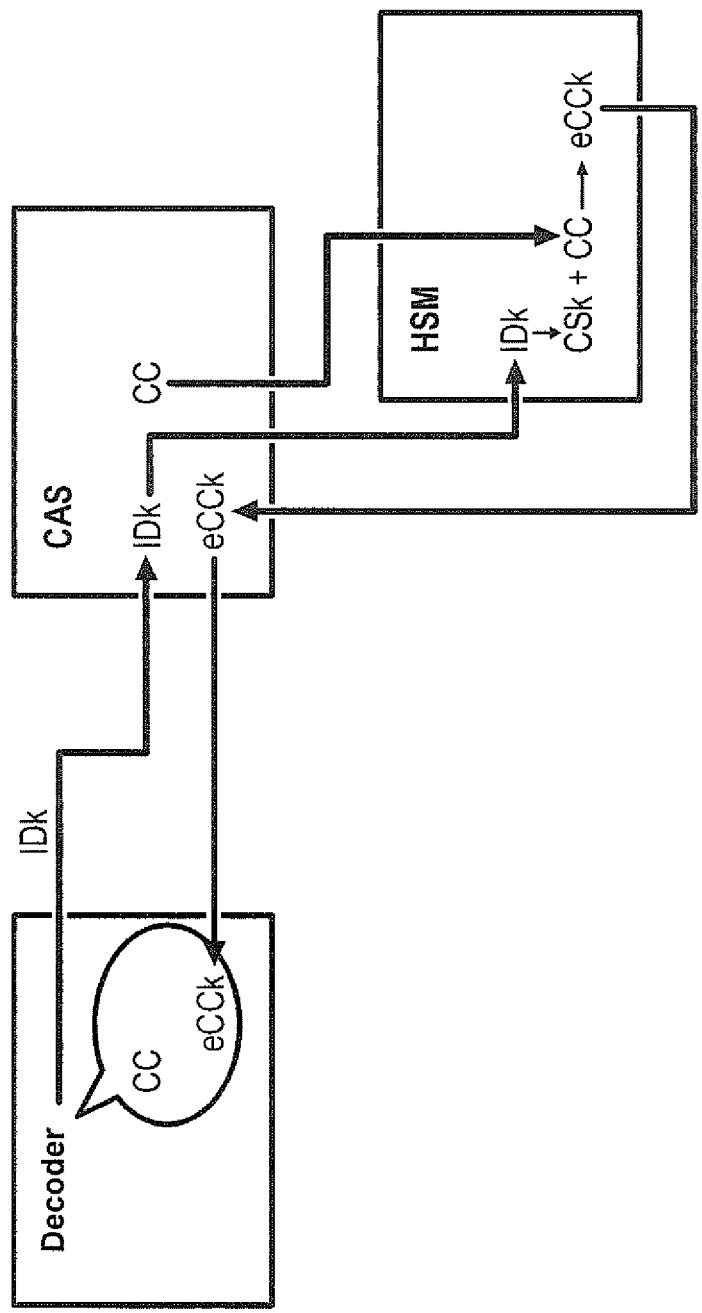
Figure 4:
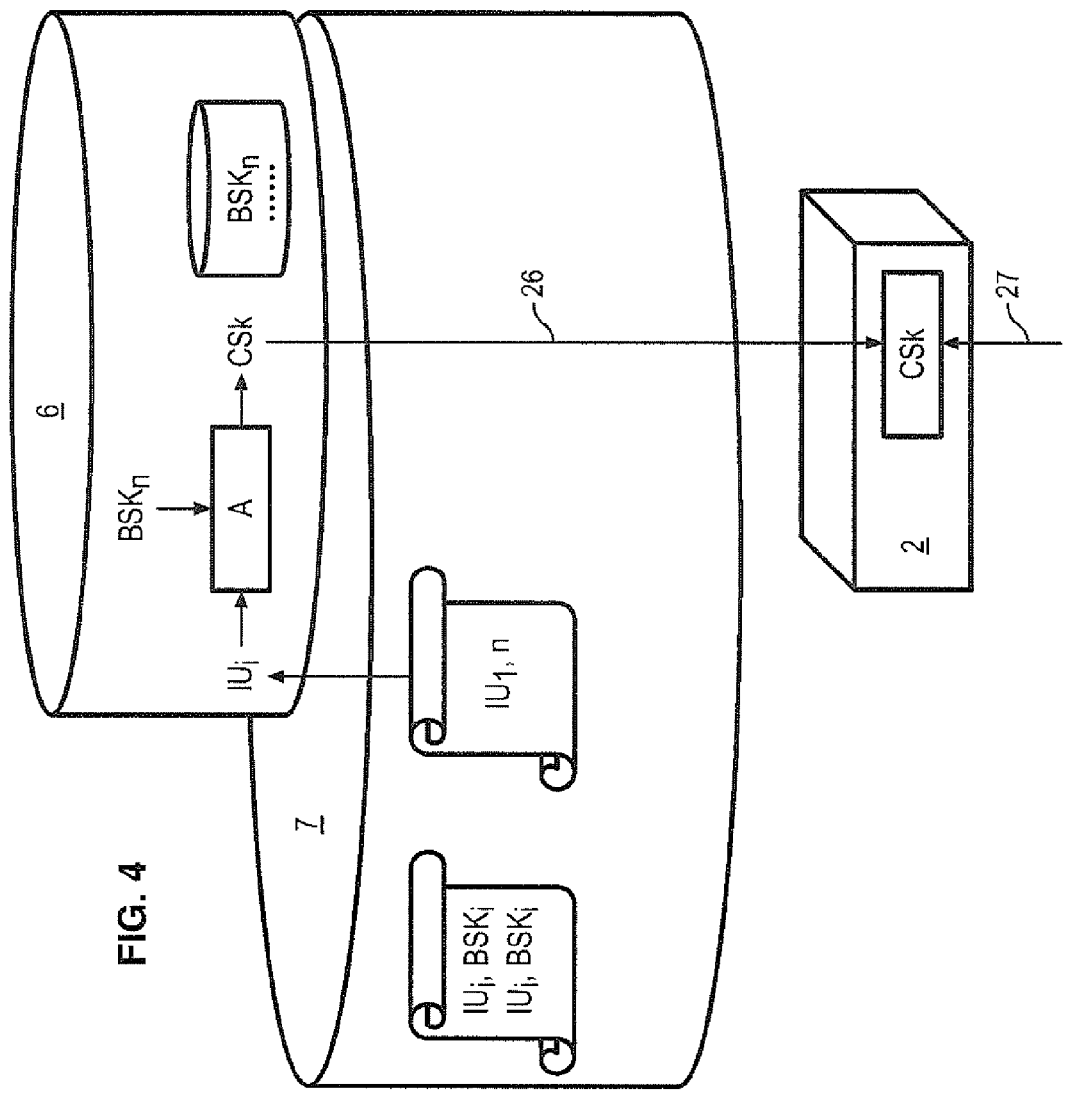

Other features and advantages of the invention will become apparent upon reading the following description, with reference to the appended figures, which illustrate in:

FIG. 1, a schematic view of the structure of a system for secured broadcasting of a data flow according to an embodiment of the invention;

FIG. 2, an illustration of the mechanism for generating the secret key CSk according to the invention;

FIG. 3, another illustration of an embodiment of the method according to the present invention, and FIG. 4, an illustration of an embodiment of the method according to the present invention relating to the integration of the key CSk into the terminal.

For more clarity, identical or similar elements are marked with identical reference signs on the whole of the figures.

DETAILED DESCRIPTION OF AN EMBODIMENT

In an exemplary embodiment of the system according to the invention, FIG. 1 shows a system comprising:

a technical platform 1, and a terminal 2.

This technical platform 1 includes a unit for generating ciphering/deciphering keys 4 and a unit for ciphering the data flow 3, as well as a device 12 for receiving digital data forming the multimedia contents of the digital data flow, and a device 11 for encoding this multimedia content according to the standards mentioned hereafter in a non-exhaustive way: DVB, ISDB or further ATSC, which provide encodings for video according to the MPEG-2, H.264/MPEG-4 AVC standards and for audio MP1L2, AC-3, AAC, HE-AAC.

The unit for generating ciphering/deciphering keys 4 includes a server 7 for managing the rights relating to the contents of the data flow, archiving in its database ciphering key indexes n associated with identifiers $IU_i$ (or also called iDK) of terminals. This server 7 notably manages the information relating to subscriptions and to the rights of the users.

This server 7 is connected to a server 8 for managing channel keys CC. This server 8 is able to generate channel keys CC for each type of broadcast contents via the digital data flow. These channel keys CC may have a predefined duration of validity which may for example be 24 hours. The keys of channels CC are therefore sent to the terminal 2.

The server 8 for managing the channel keys CC is connected to a server 6 for generating secret keys CSk. This server 6 comprises in its database a ciphering key BSK (master key).

Optionally, the server 6 may comprise in its database not one but a set of X ciphering keys $BSK_n$, respectively associated with ciphering key indices n.

In this case, a key $BSK_n$ will be associated with each index IUk. The server 7 may be used for storing in a database the match:

IUk→index n.

It will also be noted that n for $BSK_n$ is defined as being able to be equal to 1 or 1 to X.

The server 6 is an HSM (acronym of Hardware Security Module). The HSM is an electronic piece of hardware, considered as tamperproof, providing functions for storing data and providing capability for cryptographic computations. These functions allow harboring of the keys and their use in a secured enclosure.

The Hardware Security Modules meet the international security standards such as FIPS 140 and common EAL4+ criteria and support major cryptographic APIs, PKCS#11, CryptoAPI, and Java JCA/JCE.

This server 6 comprises processing means which are capable of executing a cryptographic algorithm which may generate a secret key CSk from the identifier of a terminal $IU_i$ and from the cipher key $BSK_n$ which is associated with it and of ciphering a datum by means of this CSK key.

The unit for ciphering the data flow 3 includes a scrambling and multiplexing server 10 and a ciphering server 9.

This server 10 comprises processing means for scrambling the digital data flow, the contents of which has been encoded by device 11, with view to transmitting this presently scrambled data flow to the terminal. This scrambling is achieved by means of a control key CW; which typically changes every 10 seconds. This control key CW is transmitted to the server 9 through linking means.

The ciphering server 9 comprises processing means with which an ECM message may be generated, corresponding to the control key CW encrypted from the channel key CC. This ECM message is then transmitted to the scrambling and multiplexing server 10 so as to be sent to the terminal.

The terminal 2 for example relates to a decoder box and more generally to all equipment comprising in a non-exhaustive way:

at least one microprocessor, one secured device for descrambling the data flow for example of the television type (DMUX).

volatile and/or non-volatile and/or bulk memory, communication means, and audio/video interfaces.

The communication means of this terminal 2 for example relate to the following technologies and/or standards:

Ethernet, Bluetooth and/or IrDA (Infrared Data Association), and/or Wi-fi (abbreviation of wireless fidelity) and/or Wimax, and GPRS (General Packet Radio Service), GSM, UMTS, HSDPA or IMS (IP Multimedia Subsystem).

The secured device 27 on board the chipset of the TV decoder 2 is an electronic component, considered as tamper-proof, providing functions for storing data and capability of cryptographic computations. These functions allow secured harboring of the keys and their use in a secured enclosure: deciphering of the flows without exposing the secret keys to an environment outside the secured device.

The ciphering key $BSK_n$ was obtained by the server 6 from the index of the ciphering key n recovered as a response to a request comprising the identifier $IU_i$ of the terminal, transmitted via the server 8 to the server 7, during the succession of the steps 22, 19, 20, 21.

As this is illustrated in FIG. 4, this secret key CSK is transmitted by the server 6 to the TV decoder 2, during a step 26 and is subsequently integrated into the secured area 27 of the chipset of this TV decoder 2 of identifier $UI_i$. This step 26 is achieved upon manufacturing this terminal 2, which is subsequently called a preproduction phase.

The operation for writing the secret key CSk was carried out only once during the preproduction phase on the chipset of the TV decoder 2.

In an embodiment, the transmission of the CSk key during step 6 is secured.

Further, the exchanges achieved via these linking means are made safe by secure protocols of the SSL (Secure Socket Layer), IPSEC, TLS (Transport Layer Security) or further SSH (Secure Shell) type, this notably within the scope of exchanges between the terminal and the server 8 for managing channel keys CC.

FIG. 1 also illustrates the method for secured broadcasting of a digital data flow between a technical platform and at least one terminal. Indeed, several terminals 2 of the decoder box (or decoder) type may be connected to the technical platform 1.

In a preliminary step, this method comprises a step for receiving data of the audiovisual or multimedia type forming the contents of the digital data flow by the device 12.

These received and archived digital data are transmitted, during a step 5, to a device 11 in order to be encoded according to digital video broadcasting standards listed earlier before being transmitted to a terminal 2.

This flow of encoded digital data broadcast towards the terminal 2, via the scrambling and multiplexing server 10 during a step 13, is scrambled, typically according to the DVB CSA standard, continuously from a control key CW which regularly changes for example every 10 seconds. This ciphering is achieved at the scrambling and multiplexing server 10.

This flow is subsequently multiplexed with an ECM message by the scrambling and multiplexing server 10 before being transmitted to the server 2 during a step 17 (DVB Simulcrypt standard).

This message comprises the control key CW ciphered by a channel key CC. This message is transmitted to the server 10 by the ciphering server 9, during a step 16.

This ECM message is produced by the processing means of the ciphering server 9 from the control key CW and from the channel key CC.

To do this, the control key CW is sent by the scrambling and multiplexing server 10 to the server 9 during a step 14, and the channel key CC is transmitted by the server 8 for managing channel keys CC during a step 15.

It will be noted that a channel key CC is generated for each audiovisual or multimedia content broadcast by this digital data flow and is notably valid for a duration t which for example corresponds to 24 hours.

Upon receiving the data flow, the terminal generates a request including its identifier $IU_i$, which request is transmitted, during a step 18, to the server 8 for managing channel keys CC in order to have this key for decrypting the ECM message and thereby obtaining the control key CW allowing unscrambling of the digital data flow. In another embodiment, this step 18 may occur after receiving the data flow.

Upon receiving this request, the server 8 for managing channel keys CC checks the rights of access of the user of the terminal, with respect to the audiovisual or multimedia contents of this digital data flow received by the terminal 2.

To do this, a request including the identifier $IU_i$ of the terminal is transmitted during a step 19, to the server 7 notably comprising in its databases the information relating to the subscriptions and to the rights of the users as well as indexes n of a ciphering key associated with identifiers $IU_i$ of terminals.

In response to this request, the server 7 sends back during a step to the server 8 for managing channel keys CC, the index n of a ciphering key relating to this identifier $IU_i$ as well as the status of the rights of the user with respect to the contents of the data flow received by the terminal.

The server 8 for managing channel keys CC identifies on the basis of these elements received from the server 7, the channel key CC required for deciphering the ECM message by the terminal and transmits, during step 21, this channel key CC to the server 6 for generating secret keys CSk, as well as the identifier $IU_i$ of the terminal and the identified ciphering key index n.

From elements received from this channel key CC server 8, the server 6 for generating secret keys CSk selects in its database, from the identified ciphering key index n, the unique ciphering key $BSk_n$.

The ciphering key $BSk_n$ having been selected, the processing means of the server 6 generate a secret key CSK from a cryptographic algorithm using the identifier $IU_i$ of the terminal and the selected ciphering key $BSK_n$, associated with said identifier.

The channel key CC is then ciphered from this secret key CSk so as to obtain a message eCCk, said message eCCk being subsequently transmitted, during a step 22 to the service key CC server 8, before being sent to the terminal, during a step 23.

Upon receiving this message eCCk, the terminal deciphers it from the secret key CSk archived in the secured area of its chipset, so as to obtain the channel key CC required for deciphering the ECM message.

Once the ECM message is deciphered from the channel key CC in order to obtain the control key CW, the digital data flow is descrambled.

Advantageously, with the invention, it is possible to find a remedy to the risk of disclosure of CSk keys by:
  using the hardware security module of the "HSM" type for managing these keys,
  not storing and transferring the CSk keys, which are generated on the fly from a unique identifier by a decoder;
  inserting in a preproduction phase, the key on the assembling line of the decoder, and
  ciphering in a production phase, with CSk keys, data to be transmitted to the TV decoder by the key server CAS, and
  by not exposing the CSk keys during the production phase, by generating them on the fly, (absence of storage and of transfer) and by the capability of the HSM to carry out ciphering of the data internally, therefore without outputting any CSk.

FIG. 2 illustrates the generation within the server 6 of the secret key CSk from a cryptographic mechanism A using a unique ciphering key $BSK_n$ and the identifier $IU_i$ of the terminal within the illustrated example n=1; i=1 with view to ciphering the channel key CC and obtaining a CSk message.

It will be noticed that a cryptographic algorithm is used during each ciphering and deciphering step of the invention.

Thus, the channel key CC is always archived in the memory means of the terminal in a ciphered form corresponding to the eCCk message which is deciphered from the secret key CSk as soon as this proves to be necessary.

It will be noted that the steps for deciphering the eCCk message are carried out so as to obtain the channel key CC in a secured memory area of the terminal, and the deciphering of the ECM message is achieved in this secured memory area of the terminal, as well as the unscrambling of the digital data flow from the control key CW.

Further, as this is illustrated by FIG. 3, with the invention; it is possible to protect secret keys CSk of the decoders 2, when they have to be used by a cardless CAS key server—with symmetrical ciphering—like session keys for securing the distribution of secrets (CAS keys or other "keys of channels") required for recovering descrambling keys (typically in a DVB CAS context, with scrambling DVB-CSA algorithms) with the decoder.

Moreover the invention may be applied in an installed base of decoders 2, in which each decoder 2 is provided with a secured descrambling device (DMUX), utilizing one single secret key per decoder (CSk), non-disclosure of this key being guaranteed by the use of dedicated hardware mechanisms (for example ST Microelectronics 7109 chipset). Let us recall that the CSk key is inserted in the factory in a single and definitive way during a preproduction phase, before starting to produce the TV decoder, i.e. distribute it and utilize it at the final user.

It will be noted that the cardless CAS (Conditional Access System) applied in the present invention observes DVB Symulcrypt standardization, and utilizes an IP return route, used for distributing rights and/or keys to the TV decoders 2 for descrambling TV flows, from a "key server".

Thus, it is understood that the invention is not limited to the exemplary embodiments described and illustrated. Further it is not limited to these exemplary embodiments and to the described alternatives.

The invention claimed is:

1. A method for secured broadcasting of a digital data flow between a technical platform and at least one terminal, the method comprising:
    transmitting a scrambled and multiplexed digital data flow with at least one message (ECM) including a control key (CW) encrypted with a channel key (CC);
    descrambling in a secured memory area of the terminal, the scrambled digital data flow from the control key (CW) obtained according to the following substeps:
    sending to the technical platform a request including the identifier (IUi) of the terminal;
    generating a first secret key (CSk) from a cryptographic mechanism using a unique ciphering key (BSKn) and the identifier (IUi) of the terminal, and ciphering said channel key (CC) with the first secret key (CSk) to obtain a ciphered message (eCCk);
    transmitting the ciphered message (eCCk) to the terminal;
    deciphering the ciphered message (eCCk) received by the terminal using a second secret key stored in the terminal during a production phrase of the terminal to obtain the channel key (CC), and
    obtaining the control key (CW) resulting from the deciphering of the message (ECM) from the channel key (CC);
    wherein the generating step comprises a substep for identifying a ciphering key index associated with the identifier (IUi) of the terminal and stored within a server for managing rights relating to the contents of the digital data flow; and determining the ciphering key (BSKn) from a plurality of ciphering keys archived in another server for generating secret keys (CSk), corresponding to the index.

2. The method according to claim 1, wherein the transmission step includes the following substeps:
    generating the channel key (CC);
    generating the control key (CW);
    scrambling the digital data flow from the control key (CW);
    ciphering the control key (CW) from the channel key (CC) so as to obtain the message (ECM).

3. The method according to claim 1, wherein the cryptographic mechanism (A) is selected from one of the following elements: MD5, RSA, SHA-1 or further SHA-256.

4. The method according to claim 1, wherein the message (eCCk) is sent to the terminal on the basis of a secured communications protocol of the SSL type.

5. The method according to claim 2, wherein said substep for generating the control key (CW) may be carried out every 10 seconds.

6. A system for secured broadcasting of a digital data flow between a technical platform coupled to at least one terminal the system comprising:
    at least one terminal including a chipset comprising a secured memory area which stores a secret key during a production phase of the terminal; and
    at least one processor configured to perform the steps of:
    transmitting a scrambled and multiplexed digital data flow with at least one message (ECM) including a control key (CW) encrypted with a channel key (CC);
    descrambling in a secured memory area of the terminal, the scrambled digital data flow from the control key (CW) obtained according to the following substeps:
    sending to the technical platform a request including the identifier (IUi) of the terminal;
    generating a first secret key (CSk) from a cryptographic mechanism using a unique ciphering key (BSKn) and the identifier (IUi) of the terminal, and ciphering said channel key (CC) with the first secret key (CSk) to obtain a ciphered message (eCCk);
    transmitting the ciphered message (eCCk) to the terminal;
    deciphering the ciphered message (eCCk) received by the terminal using the key stored in the terminal during the production phrase of the terminal to obtain the channel key (CC), and
    obtaining the control key (CW) resulting from the deciphering of the message (ECM) from the channel key (CC);
    wherein the generating comprises a substep for identifying a ciphering key index associated with the identifier (IUi) of the terminal and stored within a server for managing rights relating to the contents of the digital data flow; and determining the ciphering key (BSKn) from a plurality of ciphering keys archived in another server for generating secret keys (CSk), corresponding to the index.

7. The system according to claim 6, wherein said unit for generating ciphering/deciphering keys comprises:
    a first server for managing rights relating to the contents of the data flow, archiving ciphering key indexes associated with identifiers (IUi) of terminals;
    a second server for managing channel keys (CC), and
    a third server for generating secret keys (CSk).

8. The system according to claim 6, wherein said unit for ciphering the data flow includes:
    a scrambling and multiplexing server, and
    a ciphering server.

* * * * *